United States Patent [19]
Rockefeller

[11] Patent Number: 5,988,530
[45] Date of Patent: Nov. 23, 1999

[54] OILER ATTACHMENT

[76] Inventor: Michael Rockefeller, 3062 S. 13th St., Milwaukee, Wis. 53215

[21] Appl. No.: 09/126,337

[22] Filed: Jul. 30, 1998

[51] Int. Cl.$^6$ .............................. B05B 9/043; B05B 15/00
[52] U.S. Cl. ........................................... 239/333; 239/391
[58] Field of Search .................................... 239/333, 587, 239/588, 390, 391, 397; 222/527, 530, 383.3, 383.1, 575

[56] References Cited

U.S. PATENT DOCUMENTS

| | | | |
|---|---|---|---|
| 1,593,016 | 7/1926 | Campbell | 222/527 X |
| 5,251,820 | 10/1993 | Ho | 239/333 X |
| 5,645,198 | 7/1997 | Stern et al. | 239/391 X |

*Primary Examiner*—Lesley D. Morris

[57] ABSTRACT

A new oiler attachment for attachment to a disposable oil container to dispense oil contained therein. The inventive device includes a pump assembly adapted for attachment to a neck of a container of oil with an elongate intake tube extending from the pump assembly adapted for extending into the container of oil when the pump assembly is attached to the container of oil. The pump assembly also has an output for oil drawn into the pump assembly from the intake tube. The pump assembly has an actuator trigger for drawing oil from the container of oil into the lower end of the intake tube and through the pump assembly to the output of the pump assembly. At least one dispensing nozzle is provided for directing the placement of oil from the output of the pump assembly. The dispensing nozzle has an attachment end attachable to the output of the pump assembly and an open tip distal the attachment end of the dispensing nozzle.

9 Claims, 2 Drawing Sheets

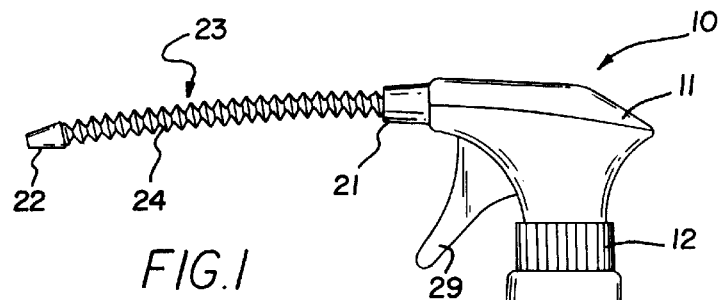
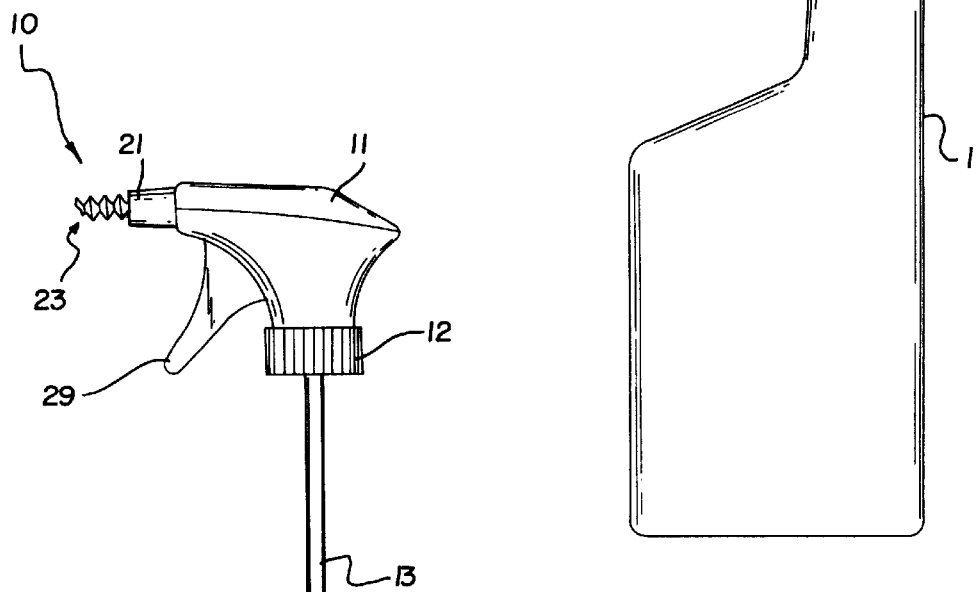
FIG.1
FIG.2

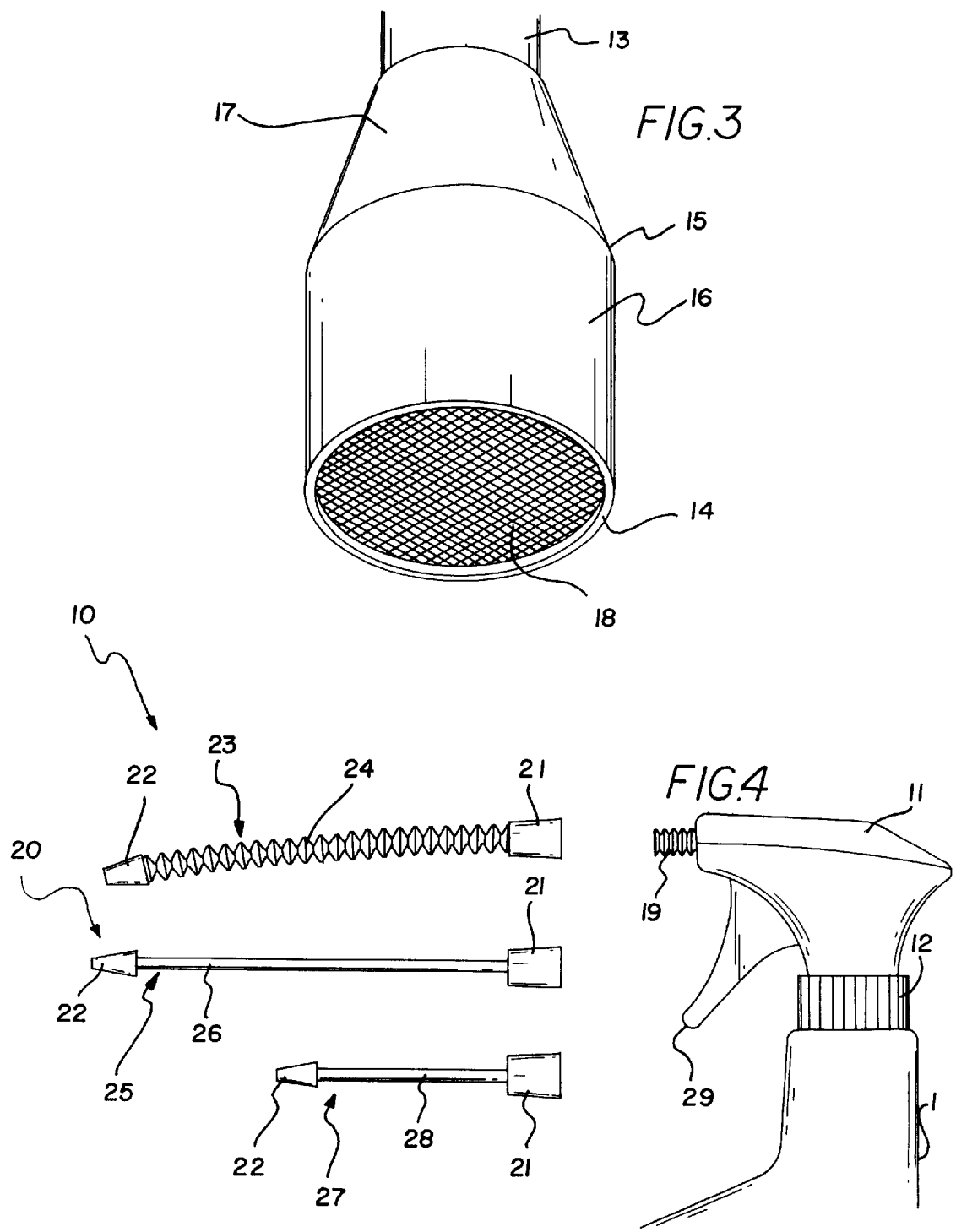

OILER ATTACHMENT

BACKGROUND OF THE INVENTION

1. Field of the Invention

The present invention relates to oil dispensing devices and more particularly pertains to a new oiler attachment for attachment to a disposable oil container to dispense oil contained therein.

2. Description of the Prior Art

The use of oil dispensing devices is known in the prior art. More specifically, oil dispensing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,642,860; U.S. Pat. No. 4,109,869; U.S. Pat. No. 3,685,739; U.S. Pat. No. 3,199,739; U.S. Pat. No. Des. 247,366; and U.S. Pat. No. 5,667,138.

While these devices fulfill their respective, particular objectives and requirements, the aforementioned patents do not disclose a new oiler attachment. The inventive device includes a pump assembly adapted for attachment to a neck of a container of oil with an elongate intake tube extending from the pump assembly adapted for extending into the container of oil when the pump assembly is attached to the container of oil. The pump assembly also has an output for oil drawn into the pump assembly from the intake tube. The pump assembly has an actuator trigger for drawing oil from the container of oil into the lower end of the intake tube and through the pump assembly to the output of the pump assembly. At least one dispensing nozzle is provided for directing the placement of oil from the output of the pump assembly. The dispensing nozzle has an attachment end attachable to the output of the pump assembly and an open tip distal the attachment end of the dispensing nozzle.

In these respects, the oiler attachment according to the present invention substantially departs from the conventional concepts and designs of the prior art, and in so doing provides an apparatus primarily developed for the purpose of attachment to a disposable oil container to dispense oil contained therein.

SUMMARY OF THE INVENTION

In view of the foregoing disadvantages inherent in the known types of oil dispensing devices now present in the prior art, the present invention provides a new oiler attachment construction wherein the same can be utilized for attachment to a disposable oil container to dispense oil contained therein.

The general purpose of the present invention, which will be described subsequently in greater detail, is to provide a new oiler attachment apparatus and method which has many of the advantages of the oil dispensing devices mentioned heretofore and many novel features that result in a new oiler attachment which is not anticipated, rendered obvious, suggested, or even implied by any of the prior art oil dispensing devices, either alone or in any combination thereof.

To attain this, the present invention generally comprises a pump assembly adapted for attachment to a neck of a container of oil with an elongate intake tube extending from the pump assembly adapted for extending into the container of oil when the pump assembly is attached to the container of oil. The pump assembly also has an output for oil drawn into the pump assembly from the intake tube. The pump assembly has an actuator trigger for drawing oil from the container of oil into the lower end of the intake tube and through the pump assembly to the output of the pump assembly. At least one dispensing nozzle is provided for directing the placement of oil from the output of the pump assembly. The dispensing nozzle has an attachment end attachable to the output of the pump assembly and an open tip distal the attachment end of the dispensing nozzle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oiler attachment apparatus and method which has many of the advantages of the oil dispensing devices mentioned heretofore and many novel features that result in a new oiler attachment which is not anticipated, rendered obvious, suggested, or even implied by any of the prior art oil dispensing devices, either alone or in any combination thereof.

It is another object of the present invention to provide a new oiler attachment which may be easily and efficiently manufactured and marketed.

It is a further object of the present invention to provide a new oiler attachment which is of a durable and reliable construction.

An even further object of the present invention is to provide a new oiler attachment which is susceptible of a low cost of manufacture with regard to both materials and labor, and which accordingly is then susceptible of low prices of sale to the consuming public, thereby making such oiler attachment economically available to the buying public.

Still yet another object of the present invention is to provide a new oiler attachment which provides in the apparatuses and methods of the prior art some of the advantages thereof, while simultaneously overcoming some of the disadvantages normally associated therewith.

Still another object of the present invention is to provide a new oiler attachment for attachment to a disposable oil container to dispense oil contained therein.

Yet another object of the present invention is to provide a new oiler attachment which includes a pump assembly adapted for attachment to a neck of a container of oil with an elongate intake tube extending from the pump assembly adapted for extending into the container of oil when the pump assembly is attached to the container of oil. The pump assembly also has an output for oil drawn into the pump assembly from the intake tube. The pump assembly has an actuator trigger for drawing oil from the container of oil into the lower end of the intake tube and through the pump assembly to the output of the pump assembly. At least one dispensing nozzle is provided for directing the placement of oil from the output of the pump assembly. The dispensing nozzle has an attachment end attachable to the output of the pump assembly and an open tip distal the attachment end of the dispensing nozzle.

Still yet another object of the present invention is to provide a new oiler attachment that eliminates the need for refilling an oil can of an oiler because the oiler attachment permits threaded attachment to the threaded neck of disposable plastic oil bottles. When the disposable plastic oil bottle is emptied of oil, the oiler attachment can be screwed off of the neck of the oil bottle and attached to the neck of another disposable plastic oil bottle while the empty oil bottle can be discarded.

Even still another object of the present invention is to provide a new oiler attachment that eliminates the messy re-filling of the oil can of traditional oilers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new oiler attachment attached to the neck of a container of oil according to the present invention.

FIG. 2 is a schematic side view of the present invention removed from the container of oil.

FIG. 3 is a schematic perspective view of the lower end of the intake tube of the present invention as seen from the vantage of line 3—3 of FIG. 2.

FIG. 4 is a schematic side view of the present invention with a set of dispensing nozzles.

DESCRIPTION OF THE PREFERRED EMBODIMENT

With reference now to the drawings, and in particular to FIGS. 1 through 4 thereof, a new oiler attachment embodying the principles and concepts of the present invention and generally designated by the reference numeral 10 will be described.

As best illustrated in FIGS. 1 through 4, the oiler attachment 10 generally comprises a pump assembly 11 adapted for attachment to a neck 2 of a container of oil 1 with an elongate intake tube 13 extending from the pump assembly 11 adapted for extending into the container of oil 1 when the pump assembly 11 is attached to the container of oil 1. The pump assembly 11 also has an output 19 for oil drawn into the pump assembly 11 from the intake tube 13. The pump assembly 11 has an actuator trigger for drawing oil from the container of oil 1 into the lower end 14 of the intake tube 13 and through the pump assembly 11 to the output 19 of the pump assembly 11. At least one dispensing nozzle 23 is provided for directing the placement of oil from the output 19 of the pump assembly 11. The dispensing nozzle has an attachment end 21 attachable to the output 19 of the pump assembly 11 and an open tip 22 distal the attachment end 21 of the dispensing nozzle.

Specifically, the oiler attachment 10 includes a pump assembly 11 having a threaded attachment ring 12 adapted for detachable threaded attachment to a threaded neck 2 of a container of oil 1. The pump assembly 11 is preferably configured for grasping by the hand of a user when the pump assembly 11 is attached to the container of oil 1.

An elongate intake tube 13 extends from the pump assembly 11. The intake tube 13 is adapted for extending into the container of oil 1 when the pump assembly 11 is attached to the container of oil 1. The intake tube 13 has an open lower end 14 for drawing oil into the pump assembly 11. The intake tube 13 is preferably generally cylindrical and has a longitudinal axis and a length extending between the pump assembly 11 and the lower end 14 of the intake tube 13. The length of the intake tube 13 is ideally sized such that the lower end 14 of the intake tube 13 is positioned close to a bottom of the container of oil 1.

Preferably, the intake tube 13 has a flared portion 15 adjacent the lower end 14 of the intake tube 13. The flared portion 15 has a cylindrical region 16 and a frusto-conical region 17. The cylindrical region 16 of the flared portion 15 of the intake tube 13 has a diameter greater than a diameter of the remainder portion of the intake tube 13 between the pump assembly 11 and the flared portion 15. Ideally, the diameter of the cylindrical region 16 of the flared portion 15 is at least two times greater than the diameter of the remainder portion of the intake tube 13. The lower end 14 of the intake tube 13 also preferably has a filter 18 for preventing passage of objects such as contaminants and particulates greater than a predetermined size into the intake tube 13 through the lower end 14 of the intake tube 13. Ideally, the filter 18 comprising a mesh screen has a plurality of apertures of the predetermined size.

The pump assembly 11 has an output 19 for oil drawn into the pump assembly 11 from the intake tube 13. The output 19 preferably has a threaded exterior. The output 19 also ideally has a longitudinal axis extending generally perpendicular to the longitudinal axis of the intake tube 13. The pump assembly 11 further includes a pivotally mounted actuator trigger for drawing oil from the container of oil 1 into the lower end 14 of the intake tube 13 and through the pump assembly 11 to the output 19 of the pump assembly 11.

A set of dispensing nozzles 20 is also provided for directing the placement of oil from the output 19 of the pump assembly 11. Each of the dispensing nozzles has a threaded attachment end 21 (such as a threaded coupling nut) detachably threadably attachable to the output 19 of the pump assembly 11. Each of the dispensing nozzles has an open tip 22 for dispensing oil therefrom distal the threaded attachment end 21 of the respective dispensing nozzle. Each of the dispensing nozzles has a length defined between the open tip 22 and threaded attachment end 21 of the respective dispensing nozzle. Preferably, the set of dispensing nozzles 20 includes an elongate flexible nozzle 23 with an elongate flexible tubular portion 24 extending between the threaded attachment end 21 and open tip 22 of the elongate flexible nozzle 23. The elongate flexible nozzle 23 is bendable along the elongate flexible tubular portion 24 to permit the user to selectively position the open tip 22 of the elongate flexible nozzle 23 at various angles with respect to threaded attachment end 21 of the elongate flexible nozzle 23.

The set of dispensing nozzles 20 also preferably includes a generally rigid first elongate nozzle 25 with an elongate tubular portion 26 extending between the open tip 22 and threaded attachment end 21 of the first elongate nozzle 25. The elongate tubular portion 26 of the first elongate nozzle 25 has a longitudinal axis generally collinear with the longitudinal axis of the output 19 of the pump assembly 11 when the first elongate nozzle 25 is attached to the output 19 of the pump assembly 11. Ideally, the set of dispensing nozzles 20 also includes a generally rigid second elongate nozzle 27 with an elongate tubular portion 28 extending between the open tip 22 and threaded attachment end 21 of the second elongate nozzle 27. The elongate tubular portion 28 of the second elongate nozzle 27 has a longitudinal axis generally collinear with the longitudinal axis of the output 19 of the pump assembly 11 when the second elongate nozzle 27 is attached to the output 19 of the pump assembly 11. The length of the first elongate nozzle 25 of the set of dispensing nozzles 20 is greater than the length of the second elongate nozzle 27 of the set of dispensing nozzles 20. Preferably, the length of the first elongate nozzle 25 is about equal to the length of the elongate flexible nozzle 23. In an ideal illustrative embodiment, the length of the elongate flexible nozzle 23 is between about 8 to 16 inches to best direct the placement of oil from the open tip. Ideally, the open tip 22 of each of the nozzles of the set of dispensing nozzles 20 has a diameter of about $\frac{1}{16}$ inch.

In use, the oiler attachment 10 is designed for attachment to a threaded neck 2 of an container of oil 1 such as a one-quart disposable plastic oil bottle for dispensing oil from the container of oil 1. The oiler attachment eliminates the need for refilling an oil can of an oiler because the oiler attachment permits threaded attachment to the threaded neck of disposable plastic oil bottles. When the disposable plastic oil bottle is emptied of oil, the oiler attachment can be screwed off of the neck of the oil bottle and attached to the neck of another disposable plastic oil bottle while the empty oil bottle can be discarded.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oiler attachment, comprising:

a pump assembly adapted for attachment to a neck of a container of oil;

an elongate intake tube extending from said pump assembly, said intake tube being adapted for extending into the container of oil when said pump assembly is attached to the container of oil;

said intake tube having an open lower end for drawing oil into said pump assembly;

said pump assembly having an output for oil drawn into said pump assembly from said intake tube;

said pump assembly having an actuator trigger for drawing oil from the container of oil into said lower end of said intake tube and through said pump assembly to said output of said pump assembly; and at least one dispensing nozzle for directing the placement of oil from the output of the pump assembly, said dispensing nozzle having an attachment end attachable to said output of said pump assembly and an open tip distal the attachment end of the dispensing nozzle.

2. The oiler attachment of claim 1, wherein said pump assembly has a threaded attachment ring adapted for detachable threaded attachment to a threaded neck of a container of oil.

3. The oiler attachment of claim 1, wherein said intake tube has a flared portion adjacent said lower end of said intake tube, said flared portion having a cylindrical region and a frusto-conical region, said cylindrical region of said flared portion of said intake tube having a diameter greater than a diameter of a remainder portion of said intake tube.

4. The oiler attachment of claim 3, wherein said diameter of said cylindrical region of said flared portion is at least two times greater than said diameter of the remainder portion of said intake tube.

5. The oiler attachment of claim 1, wherein said lower end of said intake tube has a filter for preventing passage of objects greater than a predetermined size into said intake tube through said lower end of said intake tube.

6. The oiler attachment of claim 1, further comprising an elongate flexible nozzle having an elongate flexible tubular portion extending between an attachment end and an open tip of said elongate flexible nozzle, said elongate flexible nozzle being bendable along said elongate flexible tubular portion to permit the user to selectively position the open tip of the elongate flexible nozzle at various angles with respect to threaded attachment end of said elongate flexible nozzle.

7. The oiler attachment of claim 1, further comprising a generally rigid first elongate nozzle having an elongate tubular portion extending between an open tip and an attachment end of said first elongate nozzle, said elongate tubular portion of said first elongate nozzle having a longitudinal axis generally collinear with a longitudinal axis of said output of said pump assembly when said first elongate nozzle is attached to said output of said pump assembly.

8. The oiler attachment of claim 7, further comprising a generally rigid second elongate nozzle having an elongate tubular portion extending between an open tip and an attachment end of said second elongate nozzle, said elongate tubular portion of said second elongate nozzle having a longitudinal axis generally collinear with said longitudinal axis of said output of said pump assembly when said second elongate nozzle is attached to said output of said pump assembly, wherein said first and second elongate nozzles each has a length, wherein said first elongate nozzle has a length greater than said length of said second elongate nozzle.

9. An oiler attachment for attachment to a threaded neck of an container of oil such as a disposable plastic oil bottle for dispensing oil from the container of oil, said oiler attachment comprising:

- a pump assembly having a threaded attachment ring adapted for detachable threaded attachment to a threaded neck of a container of oil, said pump assembly being configured for grasping by the hand of a user when said pump assembly is attached to the container of oil;
- an elongate intake tube extending from said pump assembly, said intake tube being adapted for extending into the container of oil when said pump assembly is attached to the container of oil;
- said intake tube having an open lower end for drawing oil into said pump assembly;
- said intake tube being generally cylindrical and having a longitudinal axis and a length extending between said pump assembly and said lower end of said intake tube;
- said length of said intake tube being sized such that said lower end of said intake tube is positioned close to a bottom of the container of oil;
- said intake tube having a flared portion adjacent said lower end of said intake tube, said flared portion having a cylindrical region and a frusto-conical region, said cylindrical region of said flared portion of said intake tube having a diameter greater than a diameter of a remainder portion of said intake tube;
- wherein said diameter of said cylindrical region of said flared portion is at least two times greater than said diameter of the remainder portion of said intake tube;
- said lower end of said intake tube having a filter for preventing passage of objects greater than a predetermined size into said intake tube through said lower end of said intake tube, said filter comprising a mesh screen having a plurality of apertures of the predetermined size;
- said pump assembly having an output for oil drawn into said pump assembly from said intake tube, said output has a threaded exterior;
- said output having longitudinal axis extending generally perpendicular to said longitudinal axis of said intake tube;
- said pump assembly having a pivotally mounted actuator trigger for drawing oil from the container of oil into said lower end of said intake tube and through said pump assembly to said output of said pump assembly;
- a set of dispensing nozzles for directing the placement of oil from the output of the pump assembly;
- each of said dispensing nozzles having a threaded attachment end detachably threadably attachable to said output of said pump assembly;
- each of said dispensing nozzles having an open tip distal the threaded attachment end of the respective dispensing nozzle;
- each of said dispensing nozzles having a length defined between said open tip and threaded attachment end of the respective dispensing nozzle;
- said set of dispensing nozzles including an elongate flexible nozzle having an elongate flexible tubular portion extending between said threaded attachment end and open tip of said elongate flexible nozzle;
- said elongate flexible nozzle being bendable along said elongate flexible tubular portion to permit the user to selectively position the open tip of the elongate flexible nozzle at various angles with respect to threaded attachment end of said elongate flexible nozzle;
- said set of dispensing nozzles including a generally rigid first elongate nozzle having an elongate tubular portion extending between said open tip and threaded attachment end of said first elongate nozzle;
- said elongate tubular portion of said first elongate nozzle having a longitudinal axis generally collinear with said longitudinal axis of said output of said pump assembly when said first elongate nozzle is attached to said output of said pump assembly;
- said set of dispensing nozzles including a generally rigid second elongate nozzle having an elongate tubular portion extending between said open tip and threaded attachment end of said second elongate nozzle;
- said elongate tubular portion of said second elongate nozzle having a longitudinal axis generally collinear with said longitudinal axis of said output of said pump assembly when said second elongate nozzle is attached to said output of said pump assembly;
- wherein the length of said first elongate nozzle of said set of dispensing nozzles is greater than the length of said second elongate nozzle of said set of dispensing nozzles; and
- wherein the length of said first elongate nozzle is about equal to the length of said elongate flexible nozzle.

* * * * *